United States Patent
Hashiba et al.

Patent Number: 5,238,467
Date of Patent: Aug. 24, 1993

[54] ABRASIVE SUSPENSION FOR WET HONING AND SURFACE TREATING METHOD USING THE SAME

[75] Inventors: Shigeto Hashiba; Yuusuke Harada, both of Minami Ashigara, Japan

[73] Assignee: Fuji Xerox Co., Ltd., Tokyo, Japan

[21] Appl. No.: 860,095

[22] Filed: Mar. 30, 1992

[30] Foreign Application Priority Data

Mar. 28, 1991 [JP] Japan .................. 3-087386

[51] Int. Cl.$^5$ .................................. B24D 3/00
[52] U.S. Cl. ............................ 51/293; 51/308; 51/309
[58] Field of Search ................... 51/293, 308, 309

[56] References Cited

U.S. PATENT DOCUMENTS

| | | | |
|---|---|---|---|
| 4,125,969 | 11/1978 | Easton | 51/308 |
| 4,575,396 | 3/1986 | Matsumoto et al. | 51/308 |
| 4,579,564 | 4/1986 | Smith | 51/293 |
| 4,666,465 | 5/1987 | Matsumoto et al. | 51/293 |
| 4,690,693 | 9/1987 | Dobbs et al. | 51/308 |

FOREIGN PATENT DOCUMENTS

2-87154  3/1990  Japan .

*Primary Examiner*—Mark L. Bell
*Assistant Examiner*—Willie J. Thompson
*Attorney, Agent, or Firm*—Oliff & Berridge

[57] ABSTRACT

An abrasive suspension for wet honing for surface treatment of an electrically conductive substrate for an electrophotographic photoreceptor, the suspension comprising pure water having suspended therein at least 20% by weight, based on the total weight of the abrasive suspension, of an abrasive and having an electrical conductivity of not more than 10 µs/cm. A conductive substrate having its surface roughened by using the abrasive suspension is free from impurities.

8 Claims, 1 Drawing Sheet

ABRASIVE SUSPENSION FOR WET HONING AND SURFACE TREATING METHOD USING THE SAME

FIELD OF THE INVENTION

This invention relates to an abrasive suspension for wet honing for surface treatment of a conductive substrate of electrophotographic photoreceptors and to a method for surface treating a conductive substrate for electrophotographic photoreceptor using the same.

BACKGROUND OF THE INVENTION

In recent electrophotographic printing in which an image is formed by line scanning with a laser beam, a semi-conductor laser having an oscillation wavelength in the longer wavelength region of 750 nm or more has frequently been used. Accordingly, electrophotographic photoreceptors exhibiting satisfactory electrophotographic characteristics to long wavelength light have been demanded. In order to obtain satisfactory image qualities with the electrophotographic photoreceptors sensitive to long wavelength light, one must settle down the problems: the interference fringe appearing on image formation and image defects such as white spots (or black spots in the case of reversal development system).

The former problem is deemed ascribed to the phenomenon that transmitted light which has not absorbed in a photosensitive layer is regularly reflected in the inside of the photosensitive layer and the substrate to generate multiple reflection of a laser beam thereby causing inference with the reflected light on the surface of the photosensitive layer. The latter problem is deemed ascribed to coating defects of a photosensitive layer and impurities incorporated into a photosensitive layer, such as different ions, different elements, different particles, and dust. It has therefore been demanded to develop a photosensitive layer free from coating defects and impurities.

It has been proposed to roughen the surface of a substrate for an electrophotographic photoreceptor by wet honing with a suspension of an abrasive to thereby overcome the above-mentioned two problems at a time as disclosed, e.g., in JP-A-2-87154 (the term "JP-A" as used herein means an "unexamined published Japanese patent application"). Wet honing holds advantages such that surface roughening can easily be achieved in a short processing time in a stable manner; desired surface roughness can be obtained with precision; and the roughness obtained is uniform with little abnormal unevenness which causes coating defects. On account of these advantages, wet honing is superior to other surface treatments such as anodizing and buffing from the considerations both of production and image quality stability against white spots or interference fringe.

Conventional wet honing techniques are effective to meet the problems of interference fringe and white spots due to coating defects arising from abnormal unevenness of the substrate but still ineffective to eliminate image defects arising from impurities attaching to the substrate. That is, because abrasives currently employed in wet honing contains impurities such as different ions, different particles and dust, spraying of such abrasives to a conductive support is accompanied by adhesion of the impurities onto the conductive substrate. The impurities adhered to the conductive substrate induce denaturation of the conductive substrate or photosensitive layer thereon, interference with formation of a uniform subbing layer on the substrate, and reduction in adhesion between the conductive substrate and the subbing layer. As a result, parts where carriers are injected into the photosensitive layer are formed, leading to image defects.

Removal of the impurities by washing a conductive substrate has been studied. However, the impurities once having entered into the valleys of the roughened surface of a substrate have stronger adhesion than those attaching to the substrate before being roughened and are therefore very difficult to remove by washing.

SUMMARY OF THE INVENTION

An object of the present invention is to provide an abrasive suspension for wet honing which is useful for the production of an electrophotographic photoreceptor causing neither interference fringe nor image defects such as white spots or black spots on image formation with a laser beam.

Another object of the present invention is to provide a method for surface treating a conductive substrate for an electrophotographic photoreceptor using the above abrasive suspension.

Other objects and effects of the present invention will be apparent from the following description.

The present inventors have noted that prevention of any impurities from adhering to a substrate would be the surest and most effective means to eliminate the problem of image defects caused by impurities adhered to a roughened conductive substrate. The inventors have studies influences of impurities present on abrasive materials used for surface roughening of a conductive substrate (wet honing) upon image defects and, as a result, found that an electrophotographic photoreceptor prepared from a conductive substrate having been roughened with an abrasive suspension having a prescribed electrical conductivity obtained, e.g., by washing with pure water, has considerably improved image quality stability on repeated use as compared with that prepared from a conductive substrate having been roughened with a non-washed abrasive, and thus completed the present invention.

The present invention provides a suspension of an abrasive for wet honing for surface treatment of a conductive substrate of an electrophotographic photoreceptor, which suspension comprises pure water having suspended therein at least 20% by weight, based on the total amount of the suspension, of an abrasive and has an electrical conductivity of not more than 10 $\mu$s/cm.

The present invention also provides a method for surface treating a conductive substrate for an electrophotographic photoreceptor, which method comprises subjecting a conductive substrate for an electrophotographic photoreceptor to wet honing with an abrasive suspension comprising pure water having suspended therein at least 20% by weight, based on the total amount of the abrasive suspension, of an abrasive and having an electrical conductivity of not more than 10 $\mu$s/cm.

DETAILED DESCRIPTION OF THE INVENTION

Figure 1:
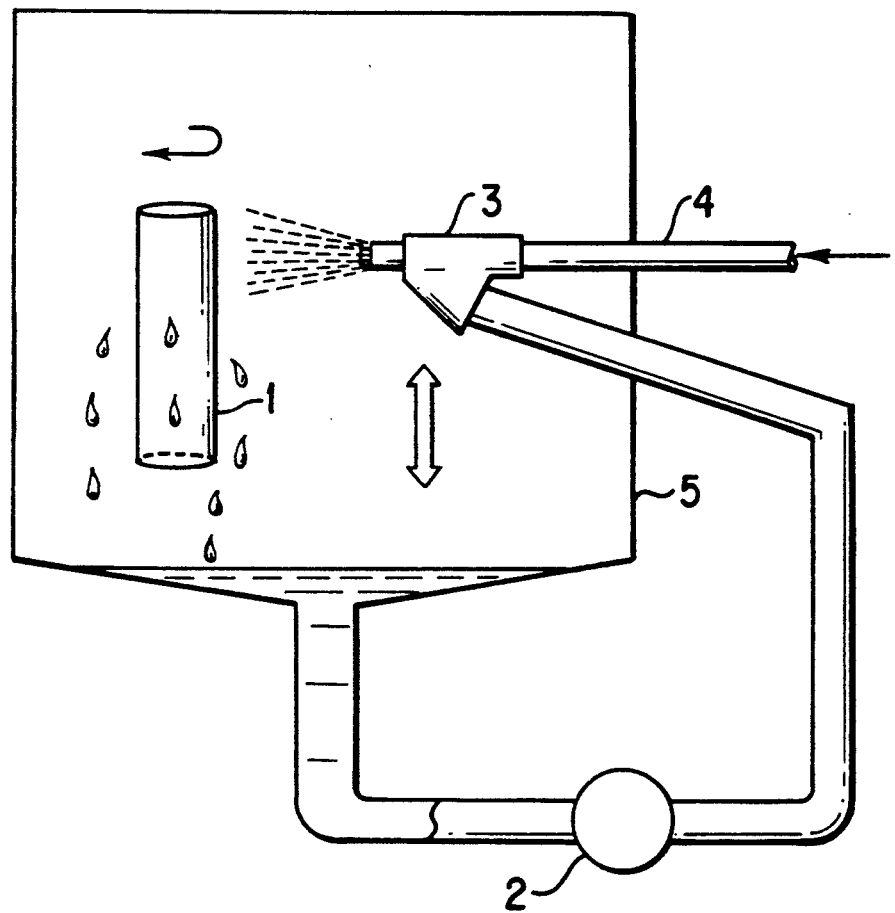
FIG. 1 is a schematic view of a wet honing apparatus which can be used in the present invention.

The abrasive suspension according to the present invention is a suspension of at least 20% by weight, preferably from 20 to 50% by weight, more preferably from 22 to 32% by weight, based on the total amount of the abrasive suspension, of an abrasive in pure water and must have an electrical conductivity (hereinafter simply referred to as "conductivity") of not more than 10 μs/cm. The conductivity of the suspension is desirably as low as possible, and is preferably not more than 2 μs/cm. A high conductivity of the suspension means adhesion of high impurity on the abrasive grains. If a suspension having a conductivity exceeding 10 μs/cm is made to strike at the surface of a conductive substrate, the impurities on the abrasive adhere to the substrate to cause image defects.

An abrasive suspension having a conductivity of not more than 10 μs/cm can be obtained, for example, by previously washing the abrasive with pure water.

Examples of the abrasives which can be used in the present invention include grains of silicon carbide, alumina, silicon nitride, boron nitride, etc. Preferred examples thereof include silicon carbide and alumina. The abrasives generally have a particle size of from 10 to 80 μm, and preferably from 20 to 50 μm. The grains of the abrasive preferably have a spherical shape.

The conductive substrate to be subjected to wet honing is not particularly limited. Examples thereof includes drums, sheets, etc. made of metals, e.g., aluminum, copper, iron, nickel, and zinc, or alloys thereof. Surface roughness of the conductive substrate attained by wet honing can be controlled by appropriate adjustment of spray pressure, spray speed, the amount, kind, shape, size and hardness of the abrasive used, the suspension concentration, and so on within such ranges that satisfy the essential requirements of the present invention, i.e., an abrasive content of 20% by weight or more and a conductivity of 10 μs/cm or less.

Wet honing according to the present invention can be carried out by using, for example, a liquid honing apparatus shown in FIG. 1. An abrasive is suspended in pure water, and the prepared abrasive suspension is supplied at a prescribed flow rate to spray gun 3 by means of pump 2. At the same time, compressive air at a prescribed pressure is fed to gun 3 through pipe 4 to spray the suspension onto rotating conductive substrate 1 while vertically moving the gun.

In one embodiment of the present invention, the wet honing may be conducted using spherical alumina grains having a diameter of 27 μm as an abrasive under the conditions of a spraying pressure of from 1.3 to 1.8 kgf/cm$^2$, a vertical moving speed of the gun of 500 mm/min, a rotating rate of the substrate of 100 rpm, and a content of abrasive of from 22 to 32% by weight.

The center-line average surface roughness Ra of the substrate having been treated according to the present invention is preferably from 0.15 to 0.21 μm (cut-off value: 0.8 mm).

Use of the thus treated conductive support in the production of an electrophotographic photoreceptor is illustrated below.

If desired, a subbing layer is provided on the surface-treated conductive support. A subbing layer is formed of any known resin generally to a thickness of from 0.05 to 10 μm, and preferably from 0.1 to 2 μm.

A photosensitive layer is then formed on the subbing layer. A photosensitive layer may have either a single layer structure or a laminate structure composed of a change generating layer and a charge transporting layer. In the latter case, the order of the charge generating layer and charge transporting layer on a substrate (or a subbing layer) is arbitrary.

A charge generating layer generally comprises a charge generating material dispersed in a binder resin. Charge generating materials to be used are known and include, for example, azo dyes (e.g., Chlorodian Blue), quinone pigments (e.g., anthanthrone, pyrenequinone), quinocyanine dyes, perylene dyes, perinone dyes, indigo dyes, bisbenzimidazole dyes, phthalocyanine dyes (e.g., copper phthalocyanine, vanadyl phthalocyanine), azulenium salts, squarylium dyes, and quinacridone dyes. Binder resins to be used are known and include polystyrene resins, polyvinyl acetal resins, acrylic resins, methacrylic resins, vinyl acetate resins, polyester resins, polyarylate resins, polycarbonate resins, an phenolic resins.

A charge generating layer can be formed by coating a coating composition prepared by dispersing the above charge generating material in the binder resin. Generally employed organic solvents can be used for the preparation of the coating composition. Examples of useful organic solvents are methanol, ethanol, n-propanol, n-butanol, benzyl alcohol, methyl cellosolve, ethyl cellosolve, acetone, methyl ethyl ketone, cyclohexanone, methyl acetate, dioxane, tetrahydrofuran, methylene chloride, and chloroform.

A charge generating layer generally has a thickness of from 0.1 to 5 μm, and preferably from 0.2 to 2.0 μm.

A charge transporting layer generally comprises a charge transporting material dispersed in a binder resin. Examples of the charge transporting materials include polycyclic aromatic compounds (e.g., anthracene, pyrene, phenanthrene), nitrogen-containing heterocyclic compounds (e.g., indole, carbazole, imidazole), pryazoline compounds, hydrazone compounds, triphenylmethane compounds, triphenylamine compounds, benzidine compounds, enamine compounds, and stilbene compounds. Also included in charge transporting materials are photoconductive polymers, such as poly-N-vinylcarbazole, halogenated poly-N-vinylcarbazole, polyvinylanthracene, poly-N-vinylphenylanthracene, polyvinylpyrene, polyvinylacridine, polyvinylacenaphthylene, polyglycidyl carbazole, pyrene-formaldehyde resins, and ethylcarbazole-formaldehyde resins. These photoconductive polymers are capable of forming a charge transporting layer by themselves.

Binder resins for a charge transporting layer are selected from a broad range of insulating resins. Examples of suitable insulting binder resins are polyvinyl butyral resins, polyarylate resins, polycarbonate resins, polyester resins, phenoxy resins, vinyl chloride-vinyl acetate copolymers, polyvinyl acetate, acrylic resins, polyacrylamide, polyamide, polyvinylpyridine, cellulose resins, urethane resins, epoxy resins, casein, polyvinyl alcohol, and polyvinyl pyrrolidone.

A charge transporting layer can be formed by coating a coating composition prepared by dispersing the above-described charge transporting material in the binder resin. Solvents to be used in the preparation of the coating composition include alcohols, e.g., methanol, ethanol, isopropanol; ketones, e.g., acetone, methyl ethyl ketone, cyclohexanone, amides, e.g., N,N-dimethylformamide, N,N-dimethylacetamide; dimethyl sulfoxide and derivatives thereof; ethers, e.g., tetrahydrofuran, dioxane, ethylene glycol monomethyl ether; esters, e.g., methyl acetate, ethyl acetate; halogenated aliphatic hydrocarbons, e.g., chloroform, methylene chloride, dichloroethylene, carbon tetrachloride, trichloroethylene; and aromatic hydrocarbons, e.g., benzene, toluene, xylene, monochlorobenzene, dichlorobenzene.

A charge transporting layer generally has a thickness of from about 5 to 50 μm.

The present invention is now illustrated in greater detail by way of Examples, but it should be understood that the present invention is not deemed to be limited thereto. All the parts and percents are by weight unless otherwise indicated.

EXAMPLES 1 TO 4 AND COMPARATIVE EXAMPLES 1 TO 9

An aluminum pipe of 1 mm in thickness, 40 mm in diameter, and 310 mm in length was cut with a mirror surface lathe using a diamond cutting tool so as to have a smooth surface having a roughness Ra of 0.04 μm. The aluminum pipe was subjected to surface roughening by the use of the liquid honing apparatus shown in FIG. 1 as follows.

An abrasive shown in Table 1 below was suspended in pure water having a conductivity of not more than 2 μs/cm with stirring, followed by allowing to stand to precipitate the abrasive. The supernatant water was discharged. The above operation of water washing was repeated until a conductivity of a 20% aqueous suspension of the abrasive was reduced to 10 μg/cm or less. 10 kg of the thus treated abrasive were suspended in 40 l of pure water to prepare a 20% abrasive suspension.

For comparison, a suspension of the abrasive shown below was prepared in the same manner as described above, except that washing of the abrasive was not conducted.

The abrasives and corresponding commercially available products used were as follows.

EXAMPLE 1

"Grain Densic GC #400" produced by Showa Denko K.K.

EXAMPLE 2

"Grain Densic GC #1500" produced by Showa Denko K.K.

EXAMPLE 3

"Densic C #280" produced by Showa Denko K.K.

EXAMPLE 4

"Densic C #700" produced by Showa Denko K.K.

COMPARATIVE EXAMPLE 1

"Grain Densic GC #4000" produced by Showa Denko K.K.

COMPARATIVE EXAMPLE 2

"Grain Densic GC #240" produced by Showa Denko K.K.

COMPARATIVE EXAMPLE 3

Prepared from "Grain Densic GC #240" produced by Showa Denko K.K. so as to have a 50% particle size of 52.5 μm.

COMPARATIVE EXAMPLE 4

The same composition as the abrasive of Comparative Example 1, except for having an average particle size of 8 μm and a bulk specific gravity of 0.69 g/cc.

COMPARATIVE EXAMPLES 5 and 6

The same as in Example 1.

COMPARATIVE EXAMPLE 7

Abrasive mainly comprising fused zircon.

COMPARATIVE EXAMPLE 8

Abrasive mainly comprising nitrided steel.

COMPARATIVE EXAMPLE 9

Glass beads "Fuji Bright" produced by Fuji Seiki Seisakusho.

Each of the above prepared abrasive suspensions was fed to gun 3 at a rate of 6 l/min by means of pump 2 and sprayed onto the aluminum pipe at a spray speed shown in Table 1 together with compressed air at a prescribed pressure. During the spraying, the gun was moved at a speed of 40 cm/min in the direction of the axis of the aluminum pipe, while the aluminum pipe was rotated at 100 rpm. The conductivity of the suspension as measured on use is shown in Table 1.

A solution of a copolymer nylon resin ("CM 8000" produced by Toray Industries, Inc.) in methanol/butanol was coated on the thus treated aluminum pipe by means of a ring coater to form a 0.7 μm thick subbing layer as a barrier layer.

3 parts of vanadyl phthalocyanine and 70 parts of a 10% cyclohexanone solution of a polyester resin ("PE 100" produced by Good Year Chemical Co.) were dispersed in a ball mill for 2 hours by using balls of 10 mm in diameter. To the dispersion was added 10 parts of 2-butanone to prepare a coating composition. The coating composition was coated on the barrier layer with a ring coater to form 0.4 μm thick charge generating layer.

4 parts of N,N'-diphenyl-N,N-bis(3-methylphenyl)-[1,1-biphenyl]-4,4-diamine and 6 parts of polycarbonate Z resin ("Yupiron Z" produced by Mitsubishi Gas Chemical Company, Inc.) were dissolved in 40 parts of monochlorobenzene. The resulting coating composition was coated on the charge generating layer by means of a dip coater at a drawing speed of 11 cm/min and dried at 110° C. for 1 hour to form a 20 μm thick charge transporting layer.

The resulting electrophotographic photoreceptor was fitted to a laser beam printer (LBP) having a dot density of 400 dpi. The output images of LBP were examined in terms of occurrence of interference fringe and image quality in the initial stage of image formation and after obtaining 20,000 copies. The image quality was evaluated by whether or not white spots or black spots appeared. The results obtained are shown in Table 1.

TABLE 1

| Example No. | Conductivity of 20% Abrasive Suspension (μs/cm) | Bulk Density (g/cc) | Spray Speed (m/sec) | Main Component of Abrasive | Image Quality Interference Fringe | Image Defects in Initial Stage of Image Formation | Image Defects After Obtaining 20000 Copies |
|---|---|---|---|---|---|---|---|
| Example 1 | 8 | 1.34 | 60 | Sic | not observed | not observed | not observed |
| Example 2 | 7 | 0.76 | 70 | " | " | " | " |
| Example 3 | 8 | 1.47 | 25 | " | " | " | " |
| Example 4 | 8 | 1.25 | 25 | " | " | " | " |
| Comparative Example 1 | 40 | 0.58 | 60 | " | observed | " | observed |
| Comparative Example 2 | 48 | 1.49 | 60 | " | not observed | observed | " |
| Comparative Example 3 | 49 | 1.62 | 60 | " | " | " | " |
| Comparative Example 4 | 39 | 0.69 | 60 | " | observed | not observed | " |
| Comparative Example 5 | 45 | 1.34 | 15 | " | " | " | " |
| Comparative Example 6 | 40 | 1.34 | 80 | " | not observed | observed | " |
| Comparative Example 7 | 50 | 1.58 | 60 | fused zircon | " | " | " |
| Comparative Example 8 | 49 | 1.55 | 60 | nitrided steel | " | " | " |
| Comparative Example 9 | 28 | — | 60 | glass beads | observed | not observed | " |

As can be seen from Table 1, the photoreceptors of Examples 1 to 4 provided images free from interference fringe or any image defects such as white spots or black spots. No problem occurred even after obtaining 20,000 copies. To the contrary, the images obtained in Comparative Examples 1 to 8 suffered from image defects of white spots or black spots after obtaining 20,000 copies in each case. In Comparative Examples 1, 4, 5, and 9, the wet honing failed to afford satisfactory satin finish to the aluminum substrate, resulting in development of interference fringe.

The abrasive suspension according to the present invention makes it possible to roughen the surface of a conductive substrate for an electrophotographic photoreceptor without causing adhesion of impurities onto the roughened surface. An electrophotographic photoreceptor produced by using a conductive substrate having the thus roughened surface, when irradiated with a laser beam for image formation, generates no interference fringe and produces excellent images free from image defects such as white spots (or black spots in the case of reversal development). Accordingly, the present invention is very useful in the production of photoreceptors suitable for electrophotographic copying machines utilizing a laser beam as a light source, and particularly scanning type electrophotographic printers in which a photoreceptor is imagewise scanned with a laser beam for image formation.

While the invention has been described in detail and with reference to specific examples thereof, it will be apparent to one skilled in the art that various changes and modifications can be made therein without departing from the spirit and scope thereof.

What is claimed is:

1. An abrasive suspension for wet honing for surface treatment of an electrically conductive substrate for an electrophotographic photoreceptor, said abrasive suspension comprising pure water having suspended therein at least 20% by weight, based on the total weight of said abrasive suspension, of an abrasive, and said abrasive suspension having an electrical conductivity of not more than 10 μs/cm.

2. An abrasive suspension as claimed in claim 1, wherein said abrasive is an abrasive having been washed with pure water.

3. An abrasive suspension as claimed in claim 1, wherein said abrasive is selected from the group consisting of silicon carbide, alumina silicon nitride and boron nitride.

4. An abrasive suspension as claimed in claim 1, wherein said abrasive has a particle size of from 10 to 80 μm.

5. A method for surface treating an electrically conductive substrate for an electrophotographic photoreceptor, said method comprising subjecting the substrate to wet honing with an abrasive suspension comprising pure water having suspended therein at least 20% by weight, based on the total weight of said abrasive suspension, of an abrasive and having an electrical conductivity of not more than 10 μs/cm.

6. An abrasive suspension as claimed in claim 1, wherein said abrasive is selected from the group consisting of silicon carbide and alumina.

7. An abrasive suspension as claimed in claim 1, wherein said abrasive has a particle size of from 20 to 50 μm.

8. An abrasive suspension as claimed in claim 1, wherein said abrasive suspension has an electrical conductivity of not more than 2 μs/cm.

* * * * *